US010699451B1

(12) United States Patent
Pai et al.

(10) Patent No.: US 10,699,451 B1
(45) Date of Patent: Jun. 30, 2020

(54) GENERATING DIGITAL GRAPHICAL REPRESENTATIONS REFLECTING MULTIPLE DATA SERIES UTILIZING DYNAMIC Y-AXES

(71) Applicant: Adobe Inc., San Jose, CA (US)

(72) Inventors: Deepak Pai, Santa Clara, CA (US); Kenneth Hahn, San Bruno, CA (US); Joshua Sweetkind-Singer, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/224,353

(22) Filed: Dec. 18, 2018

(51) Int. Cl.
*G06T 11/20* (2006.01)
*G06K 9/62* (2006.01)
*G06F 16/901* (2019.01)

(52) U.S. Cl.
CPC ........ *G06T 11/206* (2013.01); *G06F 16/9024* (2019.01); *G06K 9/6298* (2013.01)

(58) Field of Classification Search
CPC .............................. G06T 11/60; G06T 11/206
See application file for complete search history.

(56) References Cited

U.S. PATENT DOCUMENTS

| 2014/0109124 | A1* | 4/2014 | Morales | H04N 21/44222 725/14 |
| 2014/0372444 | A1* | 12/2014 | Seo | G06K 9/6218 707/737 |
| 2016/0220710 | A1* | 8/2016 | Keswani | A61K 49/0067 |
| 2017/0212668 | A1* | 7/2017 | Shah | G06F 3/04847 |
| 2018/0300914 | A1* | 10/2018 | Mikhailov | G06T 11/206 |
| 2019/0065563 | A1* | 2/2019 | Petculescu | G06F 16/248 |
| 2019/0237160 | A1* | 8/2019 | Rothberg | G06N 20/00 |

* cited by examiner

*Primary Examiner* — Ryan R Yang
(74) *Attorney, Agent, or Firm* — Kelley Jolley Preece

(57) ABSTRACT

The present disclosure relates to systems, non-transitory computer-readable media, and methods for accurately, efficiently, and flexibly generating digital graphical representations reflecting multiple data series in-scale utilizing dynamic y-axes. In particular, in one or more embodiments, the disclosed systems generate a normalized graphical representation portraying multiple data series in a common scale with a dynamic y-axis that portrays individualized data values based on user selection of various data series. Specifically, the presently disclosed systems and methods can generate normalized values for each of the included data series, plot the normalized values along a normalized y-axis, and include a dynamic y-axis that reflects the initial values of any of the included data series.

20 Claims, 11 Drawing Sheets

GENERATING DIGITAL GRAPHICAL REPRESENTATIONS REFLECTING MULTIPLE DATA SERIES UTILIZING DYNAMIC Y-AXES

BACKGROUND

Recent years have seen significant improvements in hardware and software platforms for generating graphical representations within various graphical user interfaces. Indeed, conventional digital graphical representation systems can generate and provide a variety of user interfaces with graphical representations portraying various data series. For example, conventional systems can provide a graphical representation that portrays different data series reflecting different values at different scales.

Although conventional systems can generate graphical representations portraying multiple data series, these conventional systems have a number of problems with regard to efficiency, accuracy, and flexibility. For example, some conventional systems portray different data series in different graphical representations and/or user interfaces. Such systems, however, result in excessive user interaction and time in alternating between different user interfaces and rigid interface elements. In addition, by providing data series in different user interfaces and/or rigid interface elements, such conventional systems reduce accuracy, inasmuch as the differences, trends, and contours in the various data series are not readily discernable. Furthermore, these conventional systems require inefficient generation of duplicative user interfaces (and/or interface elements).

Some conventional systems address some of these shortcomings by comparing multiple data series in a single static graphical representation. These systems however, still have a number of drawbacks. For example, when two data series have different scales or different y-variable units, many conventional systems distort the data series in order to present both series in the graphical representation. Indeed, generating a single static graphical representation spanning vastly different scales or units generally flattens the various data values, obscuring trends, contours, and subtle variations. Thus, such systems reduce the accuracy and efficacy of graphical representations portraying multiple data series.

On the other hand, some conventional systems portray multiple data series in a common range (e.g., remove units and display variance of different data series). This approach also leads to inaccurate analysis of individual data series, particularly in the loss of discernable, quantifiable values across data series. Further, such systems also introduce inefficiencies and excessive user interactions as users reference different user interfaces (and/or user interface elements) in order to determine relevant scales or values for any particular data series representation.

Thus, there are several technical problems with regard to conventional digital graphical representation systems.

BRIEF SUMMARY

Embodiments of the present disclosure provide benefits and/or solve one or more of the foregoing and other problems in the art with systems, non-transitory computer-readable media, and methods for generating accurate, efficient, and flexible user interfaces including dynamic digital graphical representations of multiple data series by utilizing dynamic y-axes. In particular, in one or more embodiments the disclosed systems generate and maintain a dynamic graphical representation of multiple data series by normalizing the native values for each data set, plotting the normalized values according to a normalized y-axis, and providing one or more dynamic y-axes that change to reflect native values of the multiple data series. The disclosed systems can modify a dynamic y-axis of the graphical representation in response to a user selection of one of the series as "in-focus," and may also change one or more visual features of the "in-focus" series to make it more visible. The disclosed systems can thus switch focus from one data series to another (e.g., with no apparent change in position or contours of the data series themselves within the graphical representation) while modifying the dynamic y-axis to provide native values of the series that is in focus. In this manner, the disclosed systems can generate a graphical representation that portrays a plurality of data series for efficient, simultaneous comparison; portrays the contours and trends of each series at high resolution for accurate analysis; and flexibly provides native y-values of any data series.

For example, in one or more embodiments the disclosed systems identify multiple data series, each containing a set of initial values, and normalize the initial values from each of the data series. Then, the system can plot the normalized values for each of the data series (e.g., relative to a normalized y-axis). In one or more embodiments, the system generates a graphical representation of the data including the normalized values plotted against the normalized y-axis and including a dynamic y-axis. For instance, the dynamic y-axis can include axis markers corresponding to the initial values of the selected data series and change depending on what data series is selected.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description describes one or more embodiments with additional specificity and detail through the use of the accompanying drawings, as briefly described below.

DETAILED DESCRIPTION

Figure 1:
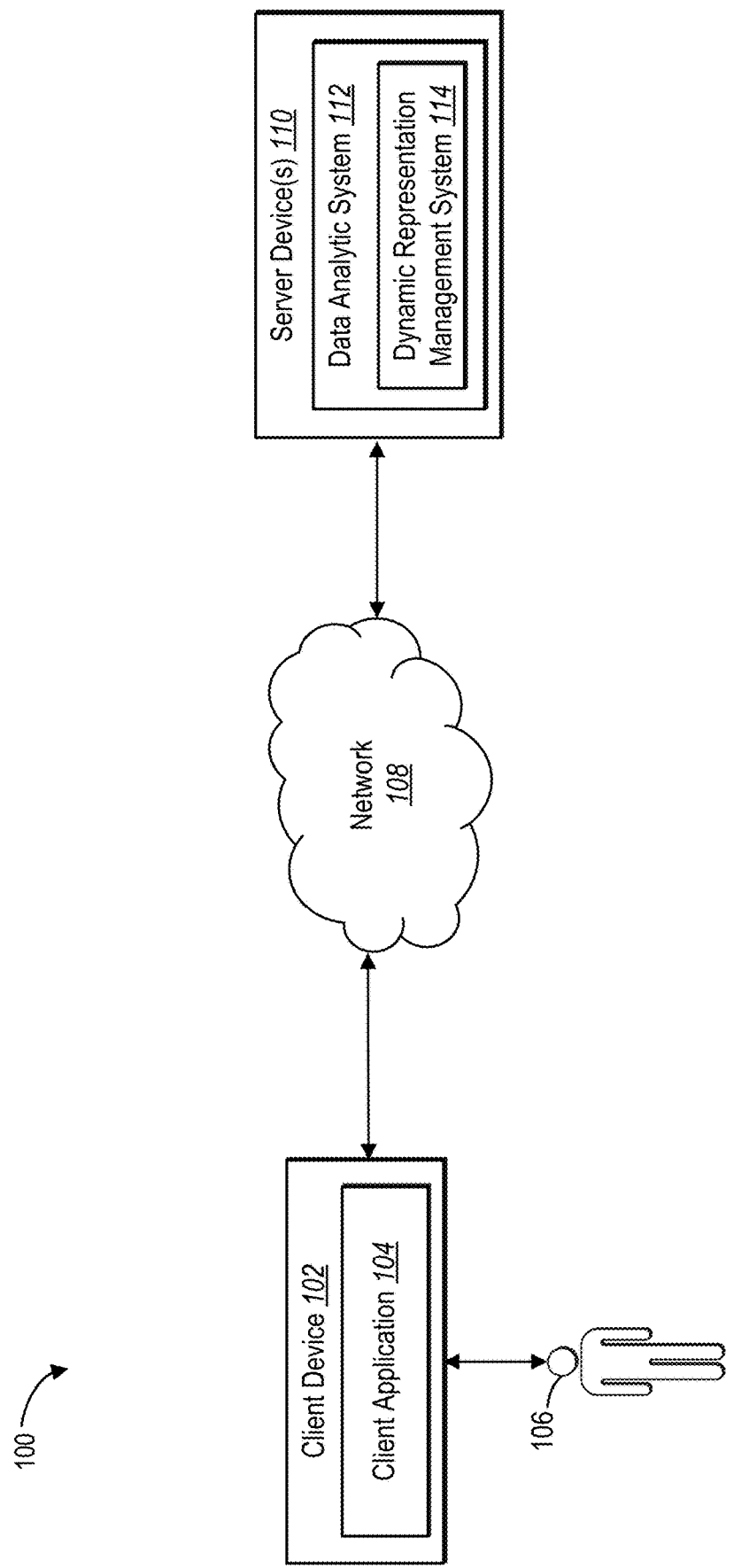
FIG. 1 illustrates a diagram of an environment in which a dynamic representation management system can operate in accordance with one or more embodiments.

One or more embodiments of the present disclosure include a dynamic representation management system that generates and maintains digital graphical representations that can refer to multiple data series in-scale by utilizing dynamic y-axes. For example, the dynamic representation management system can generate graphical representations for multiple data series with different scales and/or different y-variables by normalizing the native values from each data set, plotting the normalized values according to a normalized y-axis, and including one or more dynamic y-axes that can change to reflect the native values of the multiple data series. The dynamic representation management system can generate graphical representations for these different data series while maintaining the sense of scale for each data series and the individual contours and trends within each data series. In addition to altering the dynamic y-axis, the dynamic representation management system can also change both what data series are included in the graphical representation and the visual features of the graph based on user selection. Thus, the dynamic representation management system provides a seamless way to display native values while simultaneously portraying multiple data series in a single chart so that trends within a data series and relations between series can be accurately and efficiently analyzed.

To illustrate, the dynamic representation management system can identify different data series, where the various data series include sets of initial x values and initial y values. The y values of the various sets may include different y-variables and may be of very different scales. The dynamic representation management system can normalize the y values of each of the data series and can generate a normalized y-axis based on the normalized values. The dynamic representation management system can also generate a dynamic y-axis that includes axis markers corresponding to initial y-values from any of the data series, and the axis markers can be modified in response to user input to change the data series represented on the dynamic y-axis. The dynamic representation management system can present a graphical representation of the data series by plotting the normalized values against the normalized y-axis and including the dynamic y-axis in the graphical representation.

As mentioned above, the dynamic representation management system can generate graphical representations of various data series. These data series may be of varying scales and have different y-variables. For example, a first data series may comprise values reflecting a number of client devices interacting with digital content over time while a second data series comprises values reflecting a number duplicate client devices over time. Consequently, in order to generate a graphical representation that maintains the scale of each data series without distorting the overall trends of each data series, the dynamic representation management system may include normalized values and a dynamic y-axis in the graphical representation.

As discussed in greater detail below, the dynamic representation management system can normalize values from one or more data series and plot the normalized values against a normalized y-axis. For example, the dynamic representation management system can normalize values based on z-score and generate a normalized y-axis where each data series is centered on zero. Accordingly, in one or more embodiments, the dynamic representation management system renders the various data series according to the normalized scores with the normalized y-axis so that the contours and trends of each data series are discernable.

As mentioned above, the dynamic representation management system can also generate a dynamic y-axis and include the dynamic y-axis in a graphical representation. In one or more embodiments, the dynamic representation management system modifies the dynamic y-axis in response to user input, to reflect the initial values, y-variable, and scale of any of the data series included in a graphical representation. For example, the dynamic representation management system can modify data axis markers on a dynamic y-axis to reflect values associated with the initial y-variable and scale of a selected data series. In one or more embodiments, the dynamic representation management system does not modify the plotting of the one or more data series in response to the selection of a data series. Instead, the dynamic representation management system modifies the dynamic y-axis to correspond to the already-plotted visualization of data in the graphical representation.

As briefly referenced above, the dynamic representation management system may include multiple dynamic y-axes in a dynamic graphical representation. Further, the dynamic representation management system may determine y-axes to use based on one or more user settings and the selected data series. For example, in response to detecting a selection of two data series, the dynamic representation management system can include two dynamic y-axes in the dynamic graphical representation, one reflecting the initial values of each selected data series. Additionally, in one or more embodiments, in response to detecting the selection of three or more data series, the dynamic representation management system can modify the dynamic graphical representation to include one dynamic y-axis and one normalized y-axis.

In addition to changing the dynamic y-axis, the dynamic representation management system can also change other elements of the graphical representation in response to user input. For example, in one or more embodiments, the dynamic representation management system determines an "in-focus" data series and modifies visual aspects of the graphical representation for that data series in order to bring attention to the "in-focus" data series. The dynamic representation management system may also indicate in a menu or chart which data series is "in-focus."

The dynamic representation management system provides many advantages and benefits over conventional systems and methods. For example, by plotting normalized values against both a normalized y-axis and a dynamic y-axis the dynamic representation management system improves accuracy relative to conventional systems. Specifically, the dynamic representation management system can generate a graphical representation of multiple data series with different scales and/or y-variables while maintaining the overall scale for each data series and without distorting, flattening, or stretching the graphical representation of any of the data series. By improving readability and usability of data series, the dynamic representation system can improve accuracy in analyzing, interpreting, and utilizing corresponding graphical representations.

Further, by use of the dynamic y-axis, the dynamic representation management system also improves efficiency relative to conventional systems. Indeed, the dynamic representation management system can provide a plurality of normalized data series in a single graphical representation while also providing values specific to any data series. Thus, the dynamic representation management system can provide the contours and trends of each data series at high resolution together with data values of individual data series via the dynamic y-axis, thus reducing or eliminating the need to alternate between user interfaces or interface elements. Accordingly, the dynamic representation management system reduces or eliminates excessive user interactions attendant to user interfaces of conventional systems.

In addition, the dynamic representation management system can also improve flexibility. Indeed, the dynamic representation management system can generate dynamic, flexible graphical representations that can reflect each of many selected data series. In one or more embodiments, the dynamic representation management system generates graphical representations that change in response to user input, and specifically that can change both visual aspects of the plotted values and data axis markers in response to user input. Thus, the dynamic representation management system provides increased flexibility by providing access to detailed information regarding various selected data series in a single user interface, removing the need for a user to generate and refer to multiple graphical representations.

As illustrated by the foregoing discussion, the present disclosure utilizes a variety of terms to describe features and benefits of the dynamic representation management system. Additional detail is hereafter provided regarding the meaning of these terms as used in this disclosure. As used herein, the term "graphical representation" refers to a visualization of data. In particular, the term "graphical representation" can include a visualization of data relative to two or more axes (e.g., where data points are plotted along an x-axis and one or more y-axes). To illustrate, a graphical representation can include plotted normalized values, a dynamic y-axis, a normalized y-axis, an x-axis, and one or more user-interactable elements to modify the visualization.

Further, as used herein, the term "data series" refers to a set of related or otherwise grouped values. In particular, the term "data series" can refer to a set of values related to multiple variables. To illustrate, a data series can include a set of values in a two-dimensional array comparing two different variables (e.g., an array of x values for an x-variable corresponding to y values of a y-variable).

As used herein, the term "x variable" refers to a quantity able to assume different numerical values corresponding to an x-axis (e.g., a horizontal or some other axis of a graphical representation). In particular, the term "x variable" can refer to data points corresponding to the "x" in an (x, y) data format. To illustrate, an x variable can represent a set of values corresponding to a particular scale and unit type on an x-axis across a data series.

Additionally, as used herein, the term "y variable" refers to a quantity able to assume different numerical values corresponding to a y-axis (e.g., a vertical axis or some other axis different from the x-axis). In particular, the term "y variable" can refer to data points corresponding to the "y" in an (x,y) data format. To illustrate, a y variable can represent a set of values corresponding to a particular scale and unit type on a y-axis across a data series, and can correspond to any unit in a variety of embodiments. To illustrate, in a data series reflecting variations in user interactions over time, the y-variable can be user interactions and the x-variable can be time.

Also, as used herein, the term "initial values" refers to unmodified values from a data series. In particular, the term "initial values" can include values from one or more data series that have not been normalized (e.g., reflect the scale, variables, and units of the data series without alteration).

Additionally, as used herein, the term "normalized values" refers to values that have been modified by a factor to a particular (common) scale or range. For instance, a normalized value includes a value from a first data series that has been modified by a factor to a common scale with a value from a second data series. In particular, where $Y'_i$ is a normalized value, $Y_i$ is an initial value, $Y_{max}$ is the maximum value of the data series, $Y_{min}$ is the minimum value of the data series, $\mu$ is the mean of the series over the x-range and $\sigma$ is the standard deviation of the data series, the term "normalized values" can include values modified by the function $Y'_i=(Y_i-Y_{min})(Y_{max}-Y_{min})$, the function $Y'_i=(Y_i-\mu)/\sigma$, or any other normalization function. For example, a normalized value could be a z-score (i.e., a number of standard deviations from the mean), a standard score, or any value that shows an initial value's placement on a normal distribution curve.

Further, as used herein, the term "axis markers" refers to any visualization of data values, units and/or variables on a data axis. In particular, the term "axis markers" can include notches with corresponding values indicating the scale, range, or units of a variable corresponding to a data axis. Similarly, the term "axis marker" can include an axis title or label (e.g., a title reflecting the variable or units portrayed in the axis). To illustrate, axis markers can include labels, titles, notches, dots, slashes, figures, and any other visualization of values or variables along a data axis.

As used herein, the term "unit specific axis markers" refers to axis markers reflecting initial values for one or more data series. To illustrate, unit specific axis markers can include labels for initial variables, and/or labels based on initial scales of a data series. However, the term "normalized axis markers" refers to axis markers reflecting normalized values for one or more data series. To illustrate, normalized axis markers can include labels for normalized values, and/or labels based on a normalized scale.

Also, as used herein, the term "dynamic y-axis" refers to a y-axis that changes in response to user input. In particular, the term "dynamic y-axis" can include a y-axis that modifies its axis markers to correspond to the initial values of a data set in response to user input interacting with that data set. To illustrate, a dynamic y-axis can include a data axis, changing axis markers, and initial figures of one or more data series.

Additionally, as used herein, the term "normalized y-axis" refers to a y-axis relating to normalized values. In particular, the term "normalized y-axis" can include axis markers that reflect normalized values from one or more data series. To illustrate, a normalized y-axis can include a data axis, axis markers, and normalized values.

Further, as used herein, the term "visual features" refers to any visual portion or characteristic of a graphical user interface. In particular, the term "visual features" can include aspects of color, shape, orientation, position, or any other perceptible aspect of a user interface.

Additional detail will now be provided regarding the dynamic representation management system in relation to illustrative figures portraying exemplary embodiments. In particular, FIG. 1 illustrates a dynamic representation management environment 100. As illustrated in FIG. 1, the dynamic representation management environment 100 included a client device 102, including a client application 104, and associated with a user 106. The client device 102 communicates, via a network 108, with the server device(s) 110. The server device(s) 110 may include a data analytic system 112, which in turn may include the dynamic representation management system 114.

Although FIG. 1 illustrates the dynamic representation management system 114 implemented via the server device(s) 110, the dynamic representation management system 114 can be implemented via other components. For example, the dynamic representation management system 114 can be implemented in whole, or in part, by the client device 102. Similarly, the dynamic representation management system 114 can be implemented via both the client device 102 and the server device(s) 110.

The client device 102 can include various types of client devices. For example, the client device 102 can be a mobile device (e.g., a smart phone), tablet, laptop computer, desktop computer, or any other type of computing device as further explained below with reference to FIG. 7. Additionally, the client application 104 can include any one of various types of client applications. For example, the client application 104 can be an online application (e.g., a web browser), and a user 106 at the client device 102 may enter a Uniform Resource Locator (URL) or other address directing the web browser to a server device(s) 110. Alternatively, the client application 104 can be a different native application developed for use on the client device 102.

Additionally, the server device(s) 110 can include one or more computing devices including those explained below with reference to FIG. 7. In some embodiments, the server device(s) 110 comprises a content server. The server device(s) 110 can also comprise an application server, a communication server, a web-hosting server, a social networking server, or a digital content campaign server.

The client device 102, server device(s) 110, and network 108 may communicate using any communication platforms and technologies suitable for transporting data and/or communication signals, including any known communication technologies, devices, media, and protocols supportive of data communications, examples of which are described with reference to FIG. 7.

Although not a requirement, the dynamic representation management system 114 may be part of a data analytic system 112. The data analytic system 112 gathers, monitors, manages, and analyzes various data sources. For example, the data analytic system 112 can monitor digital activity with regard to various client devices (e.g., the client device 102), gather the activity into a digital database, analyze the data, and provide various analytics reports via one or more user interfaces. In one or more embodiments, the data analytic system 112 may provide one or more data series to the dynamic representation management system 114. In other embodiments, the server device(s) 110 may include a system other than the data analytic system 112, and the dynamic representation management system 114 may receive or collect data series via alternate means. For example, the server device(s) 110 can receive datasets via the network 108 from the client device 102 or from another source.

To illustrate, in one or more embodiments, the dynamic representation management system 114 identifies (e.g. at the server device(s) 110) a plurality of data series (e.g., data series selected by the user 106 at the client device 102). The dynamic representation management system 114 can normalize the plurality of data series and generate a graphical representation portraying the normalized plurality of data series. The dynamic representation management system 114 can also generate a normalized y-axis (based on the normalized values) and a dynamic y-axis. The dynamic representation management system 114 can then provide the graphical representation to the client device 102 for display. Based on user interaction (at the client device 102) with one of the data series, the dynamic representation management system 114 can modify the dynamic y-axis to provide axis markers corresponding to the selected data series.

Figure 2A:
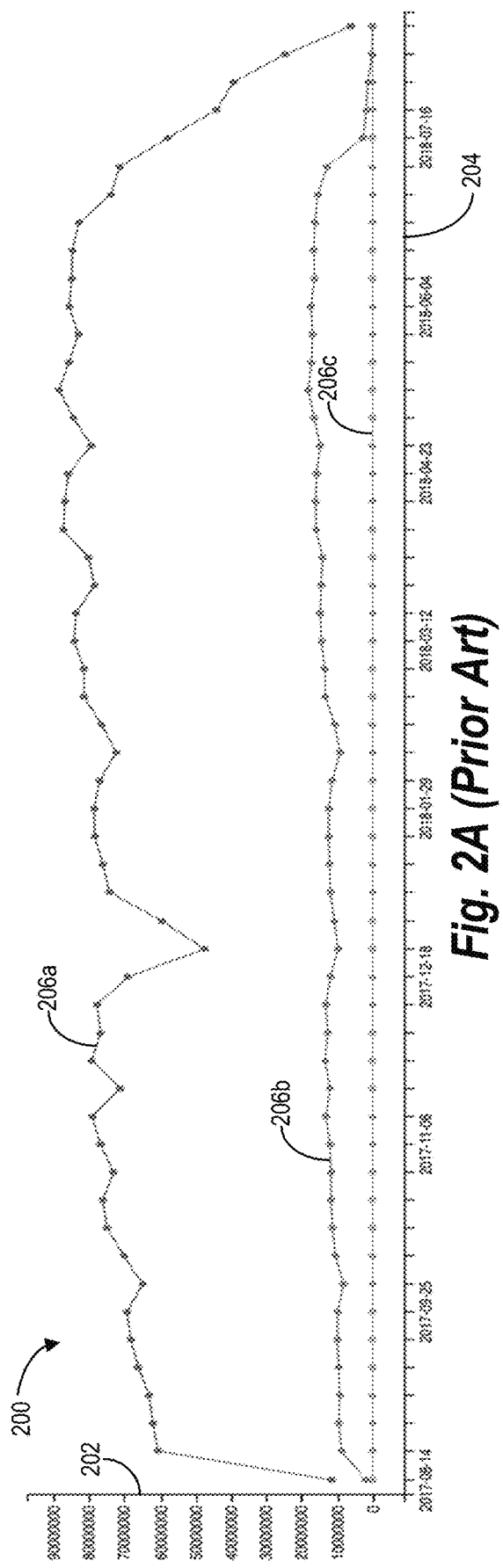
FIG. 2A illustrates a graphical representation generated by one or more conventional systems.
Figure 2B:
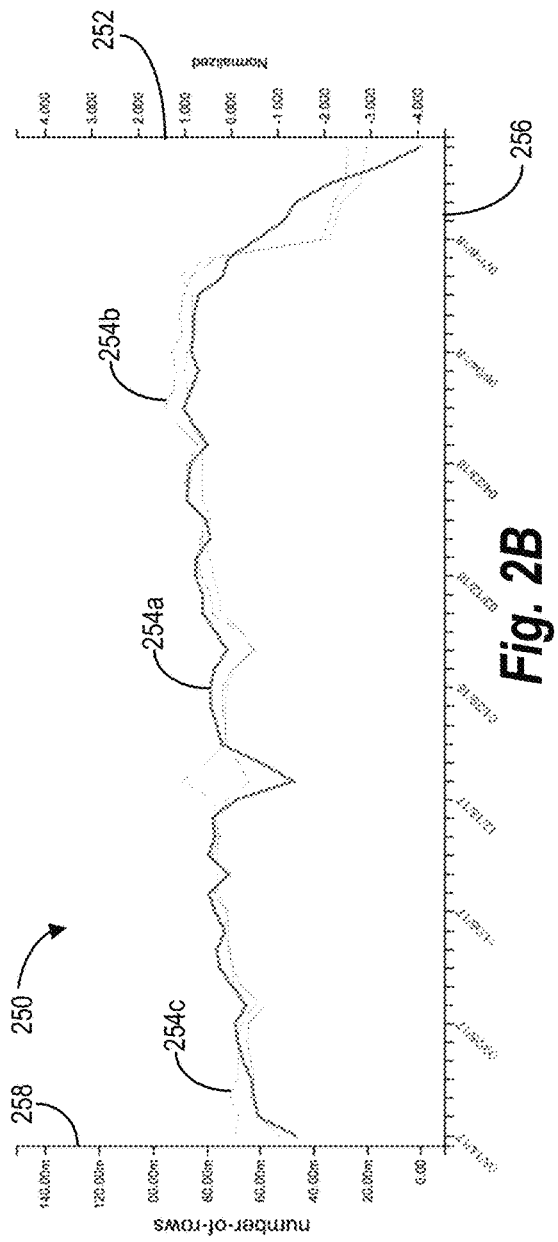
FIG. 2B illustrates an example dynamic graphical representation in accordance with one or more embodiments.

As discussed above, the dynamic representation management system 114 can generate more efficient, accurate, and flexible user interfaces portraying graphical representations of a plurality of data series than conventional systems. In particular, FIGS. 2A-2B illustrate improvements to conventional systems in accordance with one or more embodiments of the dynamic representation management system 114. For example, FIG. 2A shows an example graphical representation 200 generated via a conventional system. As shown in FIG. 2A, the graphical representation 200 includes a y-axis 202 and an x-axis 204. The y-axis 202 is scaled to accommodate all of the data series by integer, regardless of the y-variable and the varying scales of the data series. The data series are plotted against the data axes, as shown by data lines 206a-c.

As illustrated in FIG. 2A, though the trends of data line 206a are discernible, the conventional method used to plot the graphical representation 200 renders data lines 206b-c almost entirely unreadable. Only drastic trends are discernible in data line 206b, and no trends at all are discernible in data line 206c.

In contrast, FIG. 2B shows an example embodiment of a dynamic graphical representation 250 generated by the dynamic representation management system 114. The same data series plotted on the graphical representation 202 are plotted on dynamic graphical representation 250. However, dynamic graphical representation 250 generated by the dynamic representation management system 114 maintains both the readability of the trends of each data series and maintains a sense of the overall scale of each data series.

Because the dynamic graphical representation 250 may change in response to user input, it will be appreciated that FIG. 2B shows the dynamic graphical representation 250 at a moment in time, and that it may change in a variety of ways. For example, FIG. 2B shows the dynamic graphical representation 250 with the data series "number of rows" in-focus. That is, as will be described in greater detail below, the dynamic graphical representation 250 is currently highlighting or emphasizing the data series "number of rows." However, in response to user input, the dynamic graphical representation 250 may show any of the data series in-focus.

As shown in FIG. 2B, the dynamic graphical representation 250 includes a normalized y-axis 252. The normalized y-axis 252 includes normalized data axis markers shown as notches alongside numbers to three decimal places and is labeled "Normalized." However, it will be appreciated that the normalized y-axis 252 can utilize alternative approaches and elements to represent normalized values for each of the data series. The dynamic graphical representation 250 shows that each of the normalized data lines 254a-c are plotted on the normalized y-axis 252. The normalized y-axis 252 shows a normalized value range of −4.000 through 4.000 (e.g., a range of four standard deviations), but it will be appreciated that the dynamic representation management system 114 can use an alternative normalized value range. In some embodiments, the dynamic representation management system 114 can determine a normalized value range based on user preferences or one or more attributes of the plotted data series.

The normalized data lines 254a-c reflect the normalized values corresponding to the data lines 206a-c shown in the graphical representation 202. As will be discussed in greater detail below (e.g., with regard to FIG. 3), the dynamic representation management system 114 normalizes initial values of data series and plots the normalized values against the normalized data y-axis 252. However, unlike the data lines 206a-c, the normalized data lines 254a-c make the data trends of each of the data series easily discernible, as they have not been distorted like the data lines 206b-c. In other words, the dynamic representation management system 114 plots the normalized values on the normalized y-axis 252 in order to maintain the detailed trends in each data set.

The dynamic representation management system 114 also plots the normalized data lines 254a-c on an x-axis 256. FIG.

2B shows the x-axis 256 as a horizontal line with notches for data axis markers, accompanied by dates in the format MM/DD/YY, but it will be appreciated that the x-axis 256 could correspond to a variety of x-variables. Further, it will be appreciated that the x-axis 256 could include alternative markers or elements that correspond to x-values of the visualized data series.

Additionally, as shown in FIG. 2B, the dynamic graphical representation 250 includes a dynamic y-axis 258. The dynamic y-axis 258 includes data axis markers shown as notches accompanied by numbers to two decimal places and labeled "number-of-rows." The data axis markers on the dynamic y-axis 258 reflect the initial values of the "number of rows" data series. The figures on the data axis markers reflect the scale of the "number of rows" data series and correspond to the normalized data line 254a. Thus, a user 106 can discern not only the trends of the normalized data line 254a but can ascertain the scale of the line and determine specific values based on the line.

Further, the dynamic representation management system 114 modifies dynamic y-axis 258 in response to user input. In particular, the dynamic representation management system 114 modifies data axis markers to reflect initial values of any of the visualized data series. Accordingly, the user 106 may ascertain the scale of any data series and determine specific values based on the line. For example, in relation to FIG. 2B, the "number of rows" data series is in-focus and the dynamic representation management system 114 generates the dynamic y-axis 258 to include both data axis markers and a label reflecting initial values of the "number of rows" data series. The data axis markers also correspond to the normalized data line 254a, so that the dynamic y-axis 258 shows the initial values of the "number of rows" data series, and the normalized data axis 252 shows the normalized values of each of the data series. While FIG. 2B shows only one data series in-focus, as will be discussed in greater detail with regard to FIGS. 4A-4E, in response to user input interacting with any representation of another data series, the dynamic representation management system 114 may modify the dynamic graphical representation 250 to focus on any of the data series. For example, dynamic representation management system 114 may modify the axis markers and the label for dynamic y-axis 258 to reflect another data series and data line.

Thus, the dynamic graphical representation 250 shows the data trends, without distortion, by plotting the values according to the normalized axis 252, while also maintaining the sense of scale for each of the data series, by reflecting the initial values of any one of the data series on the dynamic y-axis 258.

Figure 3:
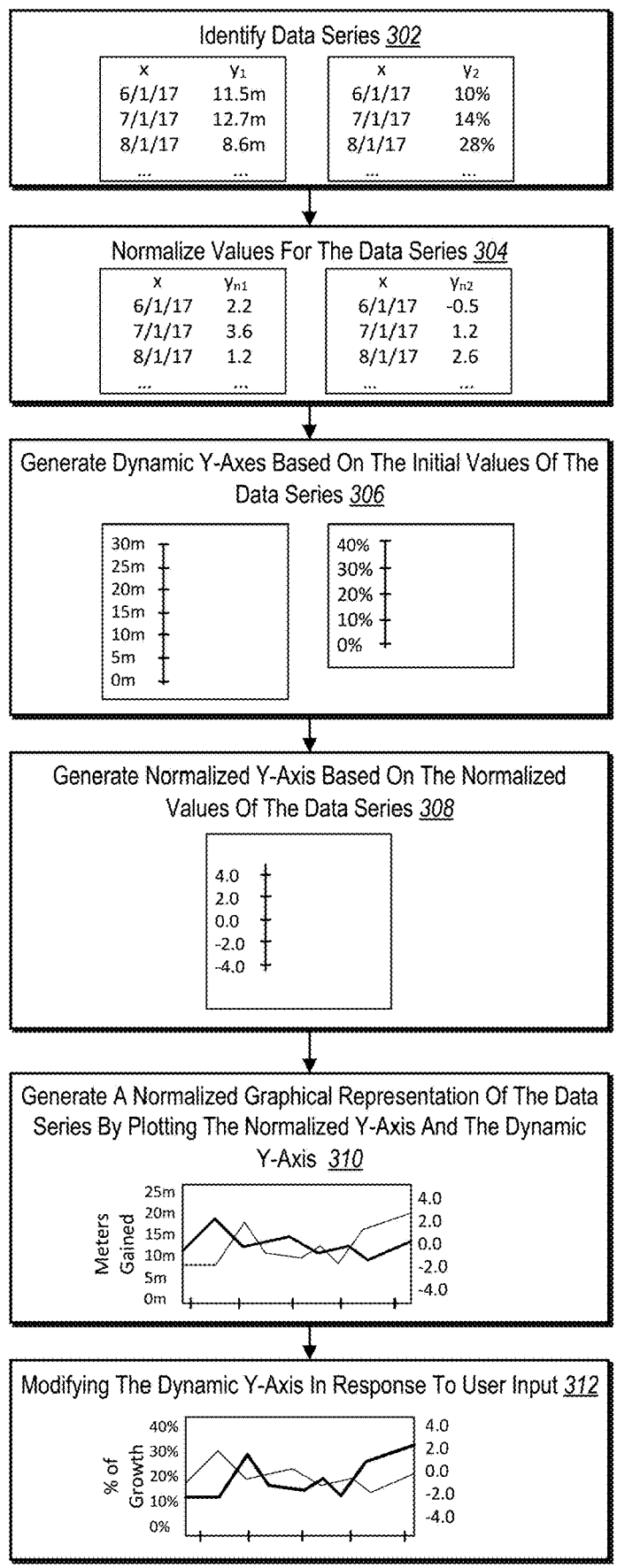
FIG. 3 illustrates a flowchart of a series of acts for generating a graphical representation with a dynamic y-axis in accordance with one or more embodiments.

As mentioned above, the dynamic representation management system 114 can generate graphical representations with a dynamic y-axis for portraying multiple data series. FIG. 3 illustrates a flowchart of a series of acts for generating graphical representations with a dynamic y-axis in accordance with one or more embodiments of the dynamic representation management system 114. As discussed with regard to FIG. 1, each of these acts may be performed via the dynamic representation management system 114 at a client device 102 and/or server device(s) 110. Though FIG. 3 shows an example of a series of acts for generating a normalized graphical representation from two data series, the dynamic representation management system 114 may generate and provide dynamic graphical representations for any number of data series.

As illustrated in FIG. 3, the dynamic representation management system 114 can also perform the act 302 by identifying a plurality of data series. The dynamic representation management system 114 can identify any number of data series. More specifically, the dynamic representation management system 114 may identify multiple data series, and the data series may each include a set of initial values for an x-variable and a set of values for a y-variable. For example, a first data series can include a first set of initial values for an x variable (e.g., time) and a second set of initial values for a first y-variable (e.g., user interactions via client devices), while a second data series may include a third set of initial values for a the x variable (e.g., time) and a fourth set of values for a second y-variable (e.g., duplicate interactions). That is, the identified series may contain sets of initial values for the same x-variable and initial values for different y-variables.

Moreover, the dynamic representation management system 114 can identify the data series based on a variety of criteria, including user settings, user input, user data, series titles, series figures, and/or metadata tags related to one or more of the data series. The dynamic representation management system 114 may also identify the data series based on user selection of one or more data series.

As discussed above, the data series may include a variety of values of varying scopes and variables. Though FIG. 3 shows two data series, each with x-values corresponding to a calendar date and with y-values corresponding to meters and percentages, it will be appreciated that these series are shown by way of example. The dynamic representation management system 114 can identify data series with a variety x-variables or y-variables and can identify a variety of data series for visualization.

As shown in FIG. 3, the dynamic representation management system 114 also performs the act 304 by normalizing values for the data series. As discussed above, the dynamic representation management system 114 can utilize a variety of methods, factors, or functions to normalize the values for each of the data series. More specifically, in one or more embodiments, the dynamic representation management system 114 normalizes the set of initial values for the y-variable for each data series. That is, continuing the example from above, the dynamic representation management system may normalize the values of the second set of initial values for the first y-variable (e.g., user interactions via client devices) and the fourth set of initial values for the second y-variable (e.g., duplicate interactions). Further, in one or more embodiments, the dynamic representation management system 114 need not normalize the set of initial values for the x-variable for any of the data series.

Additionally, the dynamic representation management system 114 may normalize values to fall within a variety of ranges. FIG. 3B shows these normalized values as numbers to one decimal point from −4 to 4 (e.g., −4 to 4 in terms of z-score for each data set). However, it will be appreciated that these normalized values are shown by way of example, and that the dynamic representation management system 114 can normalize data series based on a variety of normalization methods, as defined above. Further, the dynamic representation management system 114 may present these normalized values according to a variety of visual organizations.

As shown in FIG. 3, the dynamic representation management system 114 also performs the act 306 by generating dynamic y-axes based on the initial values of the data series. As discussed above, the dynamic representation management system 114 modifies a dynamic y-axis in response to user input to reflect the scale and y-variable of a selected data series. In one or more embodiments, this selected data series may be referred to as "in-focus."

The dynamic representation management system 114 may generate dynamic y-axes for each identified data series by determining axis markers for dynamic y-axis that reflect the initial values of the in-focus data series. In particular, the system can identify initial values corresponding to each of the normalized values generated for the in-focus data series. Then, the system can generate axis markers that reflect the initial values of the in-focus data series at regular intervals and can place them along the dynamic y-axis so that they accurately correspond to any data line that could be plotted based on the normalized values for the in-focus data series.

For example, the dynamic representation management system 114 can generate a first dynamic y-axis for a first data series based on the second set of initial values for the first y-variable (e.g., interactions via client devices). The dynamic representation management system 114 may also generate a distinct second dynamic y-axis based on the fourth set of initial values for the second y-variable (e.g., duplicate interactions). As described above, the dynamic representation management system 114 may generate axis markers and place them on the dynamic y-axis based on the initial values (e.g. the second set of initial values for the first y-variable and the fourth set of initial values for the second y-variable). The data sets may be different, have different y-variables, be of very different scales, and may yield different dynamic y-axes.

FIG. 3 shows the dynamic y-axes corresponding to each data series as a vertical line with notches accompanied by values indicating units for data axis markers. However, the dynamic representation management system 114 may present a dynamic y-axis according to a variety of visual organizations. For example, the dynamic y-axis can include data axis markers shown as dots, data axis markers shown on a grid, data axis markers shown with any of a variety of figures indicating any of a variety of units that illustrates that the dynamic y-axis reflects the initial values of the selected data series.

As further illustrated in FIG. 3, the dynamic representation management system 114 also performs the act 308 by generating a normalized y-axis based on the normalized values of the data series. The normalized y-axis may reflect the values and scale of each of the normalized data series. FIG. 3 illustrates the normalized y-axis as a vertical line with notches for data axis markers accompanied by numbers to two decimal places ranging from −4.0 to 4.0. As discussed above, the dynamic representation management system 114 may normalize values according to a variety of methods and resulting in a variety of ranges.

Moreover, as shown in FIG. 3, the dynamic representation management system 114 also performs the act 310 of generating a normalized graphical representation of the data series by plotting the normalized y-axis and the dynamic y-axis. The graphical representation of the data may include an x-axis, the normalized y-axis, and the dynamic y-axis. As described above, the dynamic y-axis may include unit-specific axis markers corresponding to the set of values for the y-variable for one of the data series included in the normalized graphical representation. The dynamic representation management system 114 may plot the normalized values of the data series according to the normalized data axis. Thus, as discussed above with regard to FIG. 2, the graphical representation will not distort the trends of the data series, regardless of different scales or variables. Further, the inclusion of the dynamic y-axis maintains a sense of scale for each of the data series.

As shown in FIG. 3, the dynamic y-axis includes data axis markers and a label "meters gained" for the in-focus data series. The dynamic y-axis reflects the scale and y-variables of the in-focus data series. As discussed above, the dynamic representation management system 114 can generate a dynamic y-axis for any data series, can modify the dynamic y-axis according to user input, and can display the dynamic y-axis in accordance with a variety of visual organizations.

Additionally, as shown in FIG. 3, the dynamic representation management system 114 emphasizes the data line corresponding to the "meters gained" data series (e.g., modifies the thickness of the line). Thus, it is easy for a user to utilize the dynamic y-axis because it is clear that the dynamic y-axis corresponds to the emphasized data line. In one or more other embodiments, the dynamic representation management system 114 may also emphasize data lines in response to user input interacting with or selecting the data series.

Though FIG. 3 shows the corresponding data line bolded, the dynamic representation management system 114 may modify visual aspects in a variety of ways to show which data line is in-focus. For example, the dynamic representation management system 114 could modify the color, texture, or thickness of the in-focus data line. Further, in one or more embodiments, the dynamic representation management system 114 may not emphasize in-focus data lines at all and may emphasize data lines based on alternate criteria or based on another user selection. For example, the dynamic representation management system 114 may emphasize one or more data lines in response to user interaction (e.g. a mouse hover) over a data series in the graphical user interface.

As illustrated in FIG. 3, the dynamic representation management system 114 also performs the act 312 of modifying the dynamic y-axis in response to user input. As shown in FIG. 3, the dynamic representation management system 114 may modify the dynamic y-axis to reflect the scale and y-variable of the initial values for the newly selected in-focus data series. The dynamic y-axis reflects the scale and y-variable of the initial values for the newly selected in-focus data series. At act 312, FIG. 3 shows the dynamic y-axis labeled "% of Growth" with values reflecting the scale and y-variable of that data series.

Additionally, the dynamic representation management system 114 may modify one or more visual aspects of the data lines, as discussed above. As shown in FIG. 3, the data line corresponding to the "percentage growth" data series is bolded (e.g., thickened), and the data line corresponding to the data series "meters gained" is no longer bolded. Again, the dynamic representation management system 114 may modify any of a variety of visual aspects of one or more data lines to demonstrate an in-focus data line. FIG. 3 shows, with respect to act 312, one embodiment of changes that the dynamic representation management system 114 may make in response to detecting a selection of a new in-focus data series. It will be appreciated that the dynamic representation management system 114 may make a variety of changes based on this selection.

Figure 4A:
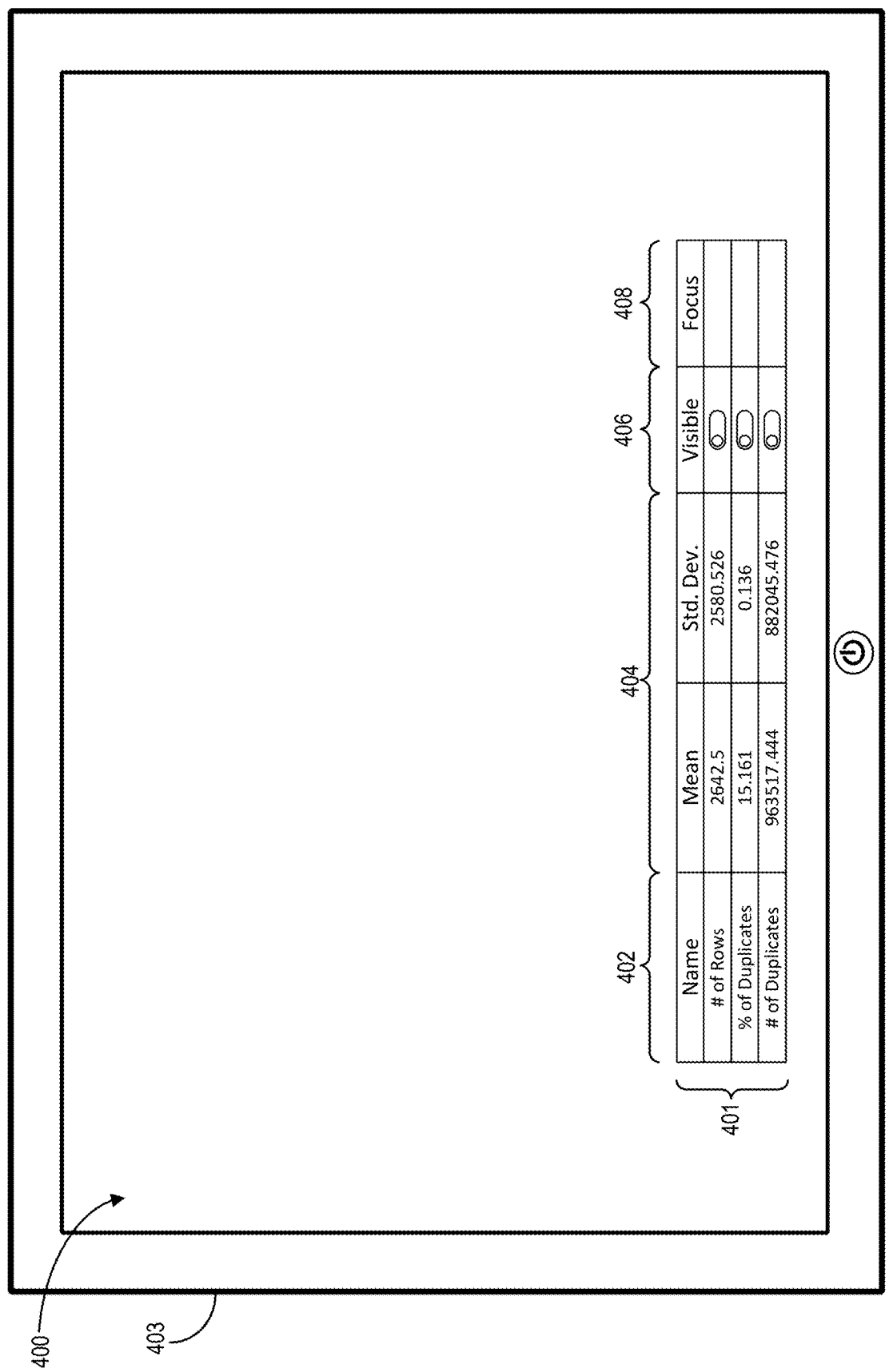
FIGS. 4A-4E illustrate an example graphical user interface for providing graphical representations in accordance with one or more embodiments.

As mentioned above, the dynamic representation management system 114 can generate a user interface for displaying graphical representations comprising a dynamic y-axis. For example, FIGS. 4A-4E illustrate an example user interface portraying graphical representations of data in accordance with one or more embodiments. Specifically, FIG. 4A shows an example graphical user interface 400 including a data series table 401 displayed via a computing device 403. The data series table 401 includes information about various data series that may be included in a graphical representation of data. Further, in response to user interaction with the data series table 401, the dynamic representation management system 114 modifies which data series is in-focus on a graphical user interface.

FIG. 4A shows the data series table 401 as a table with columns corresponding to various aspects of three data series. As discussed above, the dynamic representation management system 114 may identify any number of data series, and similarly the data series table 401 may include any number of data series. Similarly, the data series table 401 may include additional cells for additional information.

As shown in FIG. 4A, the data series table 401 includes a data series name area 402. The data series name area 402 is shown as a column on the data series table 401, with each row including the name of a data series. Additionally, the data series table 401 includes a data series information area 404. The data series information area 404 provides summary statistics regarding various aspects of the data series. FIG. 4A shows the data series information area 404 as two columns providing the mean and standard deviation of the various data series, but the data series information area 404 can include information for any number of data points and need not be restricted to only mean and standard deviation. For example, the data series information area 404 may include the number of data points for each series, the median for each data series, or the range of each data series.

Further, the data series table 401 includes a visibility toggle area 406. FIG. 4A shows the visibility toggle area 406 as a sliding icon, but the visibility toggle area 406 could include a variety of user-interactable elements. For example, the visibility toggle area 406 could include a selectable and deselectable check box, an "On/Off" button, or any user interactable element that allows the user to select and deselect and displays the current state of the setting.

The data series table 401 also includes an in-focus indicator area 408. FIG. 4A shows the in-focus indicator area 408 as an empty column, as no data series are shown in-focus in FIG. 4A. However, the dynamic representation management system 114 may show an indication in the cell corresponding to the in-focus data series. For example, the in-focus indicator area 408 may include, at the appropriate cell, a checkmark, an "X," or the text "in-focus."

The dynamic representation management system 114 may modify a graphical representation to show a selected data series in-focus in response to a variety of user inputs in a variety of embodiments. For example, the dynamic representation management system 114 may detect input selecting a data series at the in-focus indicator area 408. However, the dynamic representation management system 114 may also detect input selecting a data series at the data series name area 402, or at a data line corresponding to the data series.

Figure 4B:
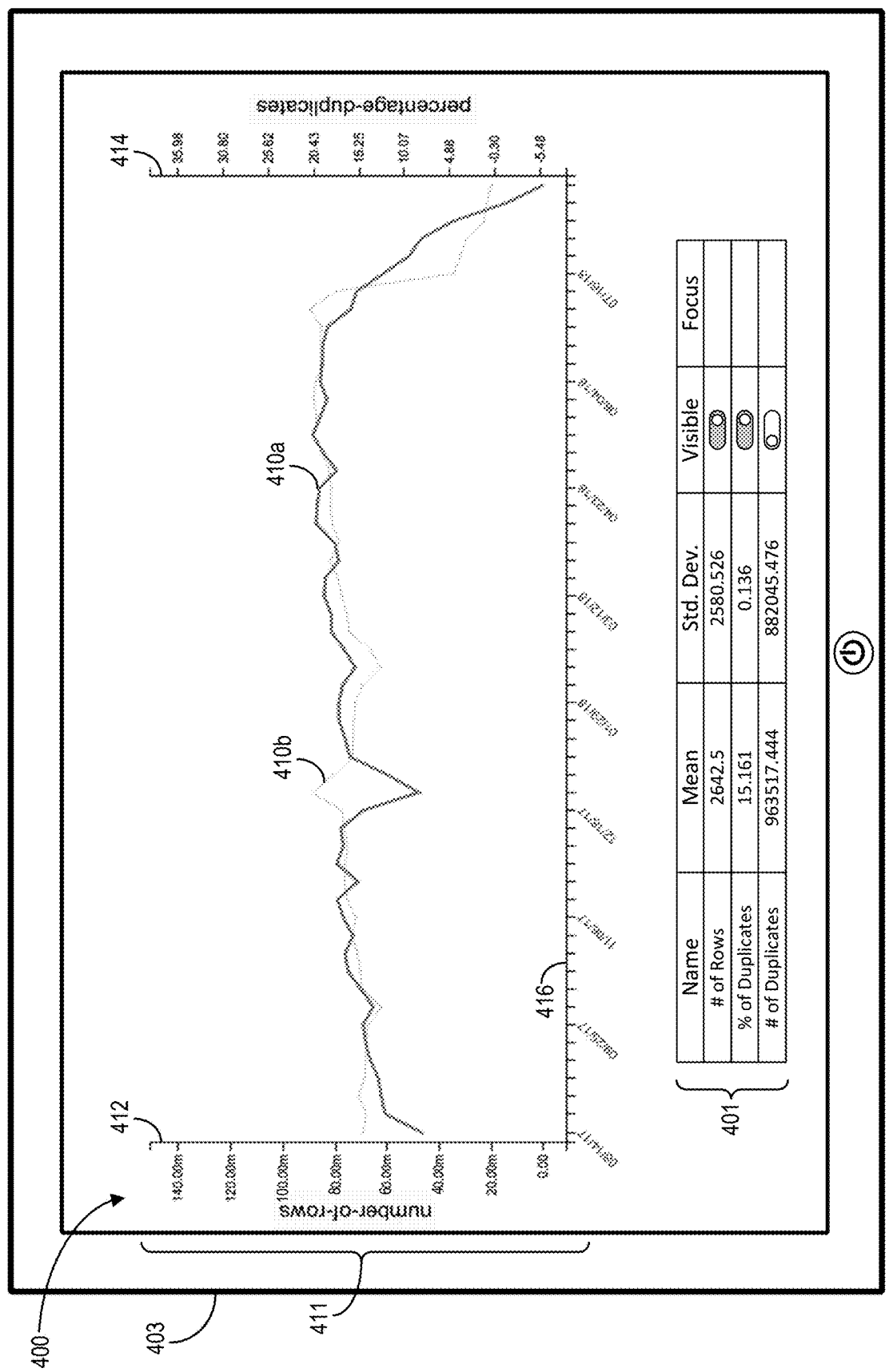

As just mentioned, the dynamic representation management system 114 can generate a graphical representation in a user interface based on user selection of one or more data series. FIG. 4B illustrates an example dynamic graphical representation 411 in the graphical user interface 400 upon selection of two data series from the data series table 401. The dynamic graphical representation 411 is shown above the data series table 401, but the dynamic graphical representation 411 and the data series table 401 could be arranged according to a variety of visual aspects in various embodiments.

As noted above, the dynamic representation management system 114 can determine what data axes to include in a dynamic graphical representation 411 based on a variety of factors, including user settings, user selections, and/or the number of or attributes of the selected data series. For example, as shown in FIG. 4B, upon detecting selection of a second data series, the dynamic representation management system 114 may include two dynamic y-axes in the graphical representation, with each one reflecting the initial value of each selected data series. The dynamic representation management system 114 may make this change automatically upon determination that the dynamic graphical representation 411 includes two data series. Further, as described in greater detail below, the dynamic representation management system 114 may modify the dynamic graphical representation 411 to include only one dynamic y-axis and one normalized y-axis in response to detecting selection of a third data series for display.

As discussed above with regard to FIG. 4A, data series table 401 shows which available data series are currently selected for visualization in dynamic graphical representation 411. Specifically, in FIG. 4B, the data series table 401 indicates that the data series "# of rows" and "% of duplicates" are visible, and that no data series is in-focus.

In response to user interaction the data series, the dynamic representation management system 114 generates the dynamic graphical representation 411, including two normalized data lines 410a-b. The dynamic representation management system 114 plots the normalized data lines 410a-b according to the normalized values of each of the data series (even though the dynamic graphical representation 411 in FIG. 4B does not include a normalized y-axis). As shown, the normalized data lines 410a-b illustrate the trends for the corresponding data series without distortion.

In relation to the embodiment of FIG. 4B, when the dynamic graphical representation 411 includes only two visible data lines, the dynamic representation management system 114 includes two y-axes (e.g., in lieu of a normalized y-axis and a separate dynamic y-axis). Indeed, as shown in FIG. 4B, the dynamic graphical representation 411 includes the first dynamic y-axis 412 and the second dynamic y-axis 414. The first dynamic y-axis 412 is labeled "number of rows" and includes values reflecting the scope and y-variable for the "number of rows" data series. The second dynamic y-axis 414 is labeled "percentage duplicates" and includes values reflecting the scope and y-variable for the "percentage duplicates" data series.

Additionally, the dynamic graphical representation 411 includes an x-axis 416. The x-axis 416 is shown as a horizontal line with notches accompanied by dates. As discussed above, the x-axis may be presented according to any of a variety of visual aspects and may correspond to any of a variety of variables, not just time.

Figure 4C:
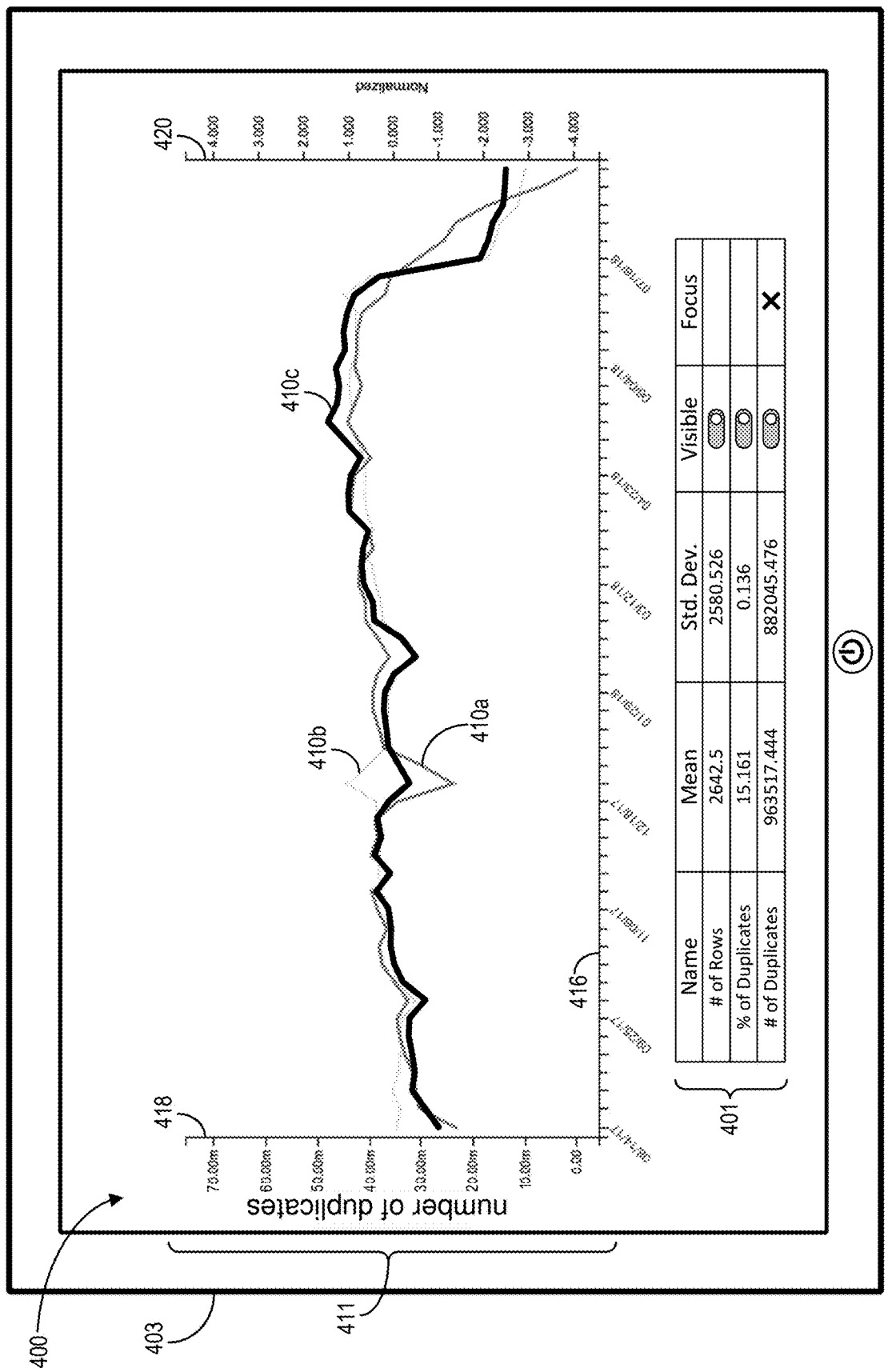

As discussed above, the dynamic representation management system 114 can also generate a normalized graphical representation for additional data series and modify a y-axis based on user input to provide information regarding initial values for particular data series. For example, FIG. 4C illustrates the example dynamic graphical representation 411 including a visualization of three data series. As shown in FIG. 4B, the dynamic graphical representation 411 includes normalized data line 410c in addition to normalized data lines 410a-b. Moreover, in response to the selection of a third data series for display, the dynamic representation management system 114 modifies the dynamic graphical representation 411 to include new data axes.

In particular, the dynamic representation management system 114 detects user input indicating a selection of an additional data series for visibility and selection of a series to be in-focus. Specifically, dynamic representation management system 114 detects user input indicating that the data series "# of rows," "% of duplicates," and "# of duplicates" should all be visible and that the data series "number of duplicates" is in-focus. In response, the dynamic representation management system 114 modifies various aspects of the dynamic graphical representation 411.

Specifically, the dynamic representation management system 114 modifies dynamic graphical representation 411 to include normalized data line 410c, which represents the newly selected data series "# of duplicates." Further, the dynamic representation management system can 114 emphasize normalized data line 410 because the data series "# of duplicates" is in-focus (or selected in the corresponding table, e.g., by hovering over the data series utilizing a mouse).

In response to detecting selection of a third data series for display, the dynamic representation management system 114 may modify the dynamic graphical representation 411. Specifically, the dynamic representation management system 114 removes the second dynamic y-axis 414 and instead include the normalized y-axis 420. Though FIGS. 4B-4C show the dynamic representation management system 114 making these modifications in response to the selection of a third data series, the dynamic representation management system 114 may make these modifications in response to a variety of user inputs or selections.

The dynamic representation management system 114 may modify the data axes included in the dynamic graphical representation 411 in a variety of ways, as described below. The dynamic representation management system 114 may determine how many data axes to include and which data axes to include based on various user settings and user inputs. Additionally, the dynamic representation management system 114 may make these determinations based on various characteristics of the identified data series, their initial values, and their normalized values. Though this disclosure enumerates several example embodiments, the dynamic representation management system may determine a variety of data axis configurations based on a variety of attributes of the included data series.

For example, the dynamic representation management system 114 may determine a data axis configuration based on the variables of each of the data series and how they relate to one another. In one or more embodiments, in response to determining that two or more included data series have different variables, the dynamic representation management system 114 can include a normalized data axis in the dynamic graphical representation 411. Additionally or alternatively, the dynamic representation management system may include dynamic y-axes that reflect the initial values for each of the different y-variables.

In another embodiment, the dynamic representation management system 114 can determine a data axis configuration based on the range or scale of one or more of the data series, and based on the similarities and/or differences between the ranges and scales of the included data series. For example, in response to comparing the data series and determining that two data series had similar scales while a third data series has a very different scale, the system may determine to include a dynamic y-axis reflecting the initial values of the third data series.

The dynamic representation management system 411 may also determine a data axis configuration based on the number of values in one or more of the included data series. For example, in response to determining that one of the data series includes a threshold number of values more than one or more of the other included data series, the dynamic representation management system 114 may include a dynamic y-axis reflecting the initial values of the data series including many more values.

In addition to modifying the dynamic graphical representation 411 to include the normalized y-axis 420 and exclude the second dynamic y-axis 414, the dynamic representation management system 114 can modify the dynamic graphical representation 411 to include the second dynamic y-axis 414 and exclude the normalized y-axis 420. Even if the dynamic graphical representation 411 includes three or more data series, the dynamic representation management system 114 may include multiple initial value data axes for any of the data series. In response to various user inputs or selections, the dynamic representation management system 114 may include an initial value data axis for a particular data series at a particular position in the dynamic graphical representation 411.

As discussed above, the dynamic representation management system 114 generates the dynamic graphical representation 411 to include the dynamic y-axis 418. The dynamic representation management system 114 can generate the dynamic y-axis 418 by determining axis markers reflecting initial values for each identified data series. That is, the dynamic representation management system 114 can determine appropriate axis markers, including labels with appropriate numbers and units, for the initial values of each data series. Then, the dynamic representation management system 114 can determine appropriate intervals and placement of the axis markers on the dynamic y-axis 418 based on the plotted normalized values. Specifically, the dynamic representation management system 114 can determine the placement of the axis markers based on the normalized values corresponding to the initial values of the data series and the data series' corresponding normalized plotted data lines. Further, the dynamic representation management system 114 can determine the placement of the axis markers on the dynamic y-axis 418 so that they show the initial values of a given data series along that plotted normalized data line 410a-b for that data series. Thus, the system can generate the dynamic y-axis 418 to facilitate the readability of the initial values of a data series based on the normalized data line 410a-b for the series.

As discussed above with regard to FIGS. 2-3, the dynamic y-axis 418 can change according to user input and can reflect the scale and the y-variable of the in-focus data series. For example, as shown in FIG. 4C, the dynamic y-axis 418 is labeled "number of duplicates" and includes data axis markers reflecting the scale and y-variable of the "# of duplicates" data series, because the "# of duplicates" data series is in-focus.

The dynamic graphical representation 411 also includes the normalized y-axis 420. The normalized y-axis 410, as discussed above with regard to FIGS. 2-3, includes data axis markers reflecting the normalized values of the data series, and is labeled "Normalized." As shown in FIG. 4C, the normalized y-axis 420 reflects the normalized values shown on the normalized data lines 410a-c. The dynamic representation management system 114 can generate the normalized y-axis 420 based on the normalized values of each of the displayed or identified data series. That is, the dynamic representation management system 114 can determine axis markers for the normalized y-axis 420 based on the scale and range of the normalized values and can determine regular intervals at which to place the data axis markers. In one or more embodiments, the normalized data lines 410a-b are plotted based on the normalized y-axis 420.

As discussed above, in one or more embodiments, the dynamic representation management system 114 may generate the normalized data axis based on the normalized values of one or more displayed data series. In such embodiments, the dynamic representation management system 114 can modify the normalized y-axis 420 in response to the user selection or deselection of one or more data series for inclusion in the dynamic graphical representation 411. For example, in response to detecting a selection or deselection that changes the range of normalized values included in the dynamic graphical representation 411, the dynamic representation management system 114 may modify the normalized y-axis 420 to reflect the updated range.

In one or more embodiments, the dynamic representation management system 114 does not modify the plotting of the normalized data lines 410a-c based on a new selection of an in-focus data series. In one or more embodiments, the dynamic representation management system also leaves the normalized y-axis 420 unmodified in response to selection of an in-focus data series. By keeping both the plotting of the normalized data lines 410a-c and the normalized y-axis 420 constant regardless of a focus change, the dynamic representation management system 114 maintains the readability of the chart even when a user changes rapidly between in-focus data series. For example, in FIG. 4C, the plotting of normalized data lines 410a-b is unchanged despite the selection of the data series "# of duplicates" and the inclusion of normalized data line 410c.

Figure 4D:
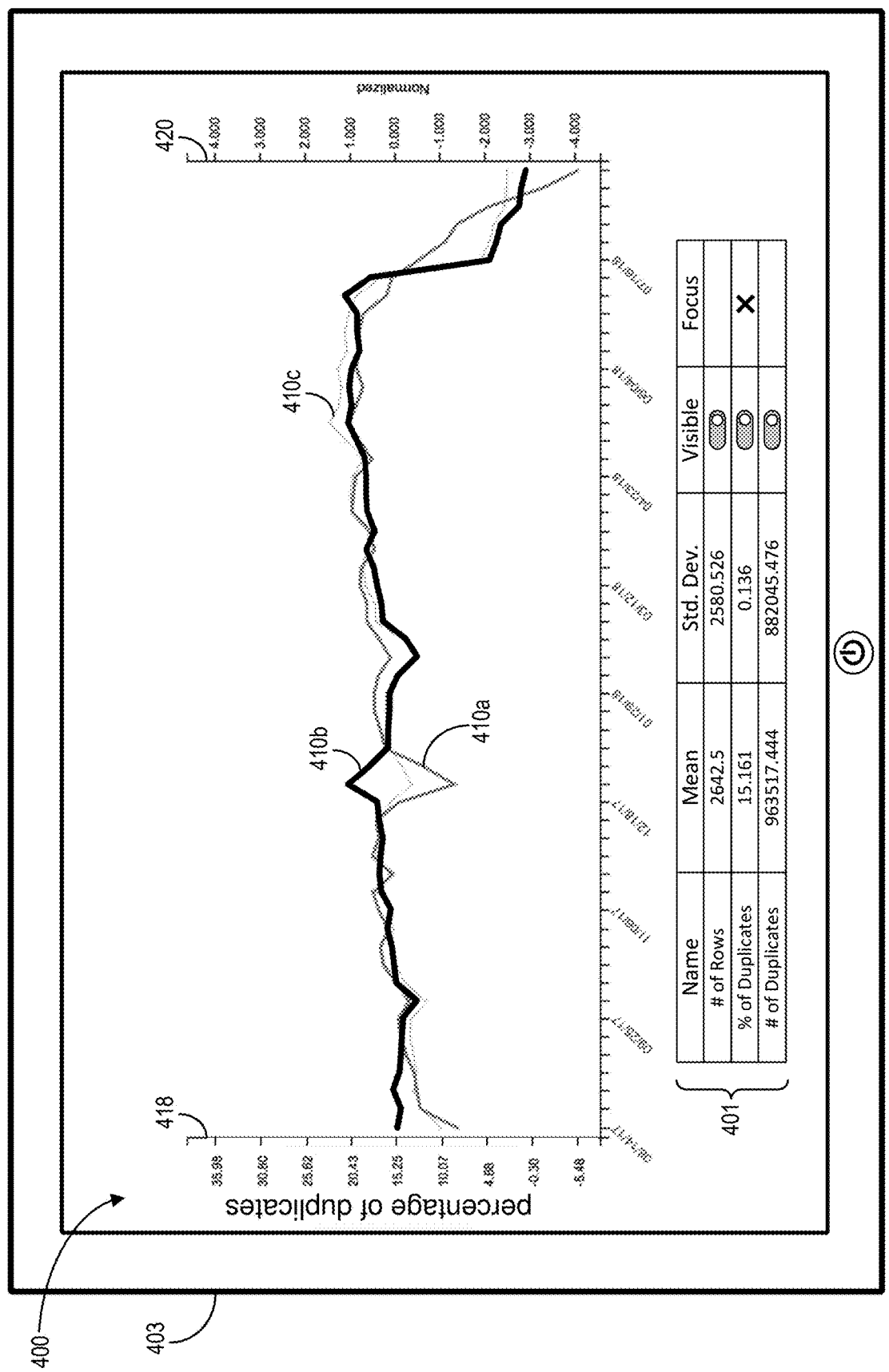

However, in response to user input selecting a new in-focus data series, the dynamic representation management system 114 can modify a dynamic y-axis 418 and/or change the appearance of one or more data lines. For example, FIG. 4D illustrates modifying a graphical representation portraying three data series based on selection of a new "in-focus" data series. In particular, FIG. 4D shows that the dynamic representation management system 114 has emphasized (e.g., bolded) normalized data line 410b upon selection of the corresponding data series. As discussed previously, the dynamic representation management system 114 can change the appearance of the in-focus line in a variety of ways.

Further, in response to user input selecting a new in-focus data series, the dynamic representation management system 114 modifies the dynamic y-axis 418. For example, in FIG. 4D, the dynamic representation management system 114 modifies the dynamic y-axis 418 and adds data axis markers, including a title ("percentage of duplicates"), tick marks, and labels reflecting the scope and y-variable of the in-focus data series (i.e., the "percentage of duplicates" series). Additionally, as shown in FIG. 4C, in response to the new selection of an in-focus data series, the data series table 401 includes a new mark indicating that the "percentage of duplicates" data series is in-focus.

Figure 4E:
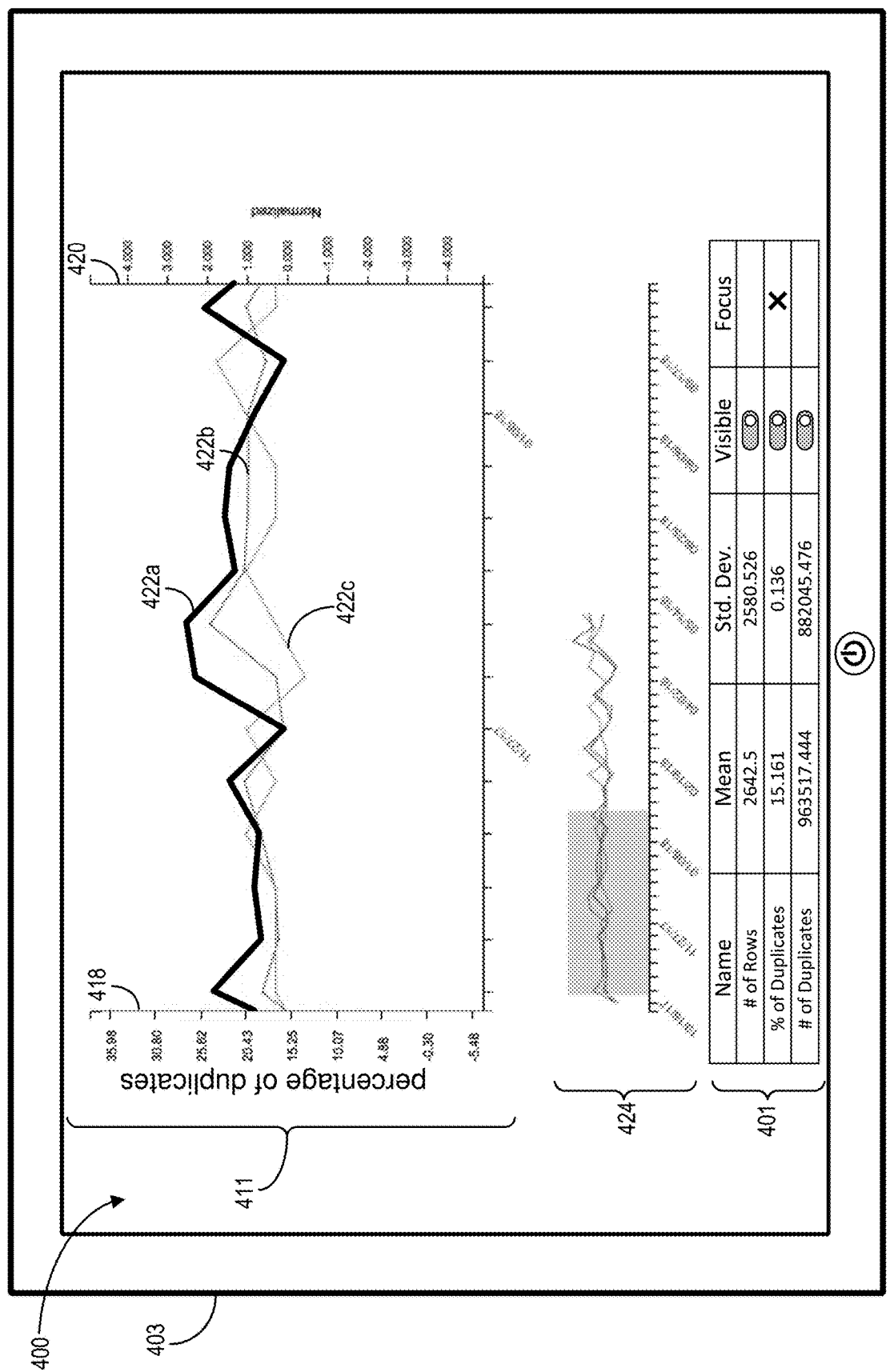

In one or more embodiments, the dynamic representation management system 114 also generates additional user interface elements for focusing on different portions of a graphical representation. For example, FIG. 4E illustrates an embodiment of a dynamic graphical representation 411 that facilitates viewing of different portions of a graphical representation with a large range of x values. In particular, the dynamic graphical representation 411 includes normalized data lines 420a-c, which correspond to the selected area on the x-axis selection area 424.

In one or more embodiments, the x-axis selection area 424 can show a zoomed-out view of normalized data lines 420a-c across a wider range of the x-variable. In response to user input via the x-axis selection area 424, the dynamic representation management system 114, modifies the dynamic graphical representation 411 to include a zoomed-in version of the selected portion of the x-axis selection area 424. For example, as shown in FIG. 4E, the shaded portion of the x-axis selection area 424 is included in the dynamic graphical representation 411. However, in one or more embodiments, the dynamic representation management system 114 can display the selected area in a variety of ways, including by a highlight, a box or other shape surrounding the selected area.

Figure 5:
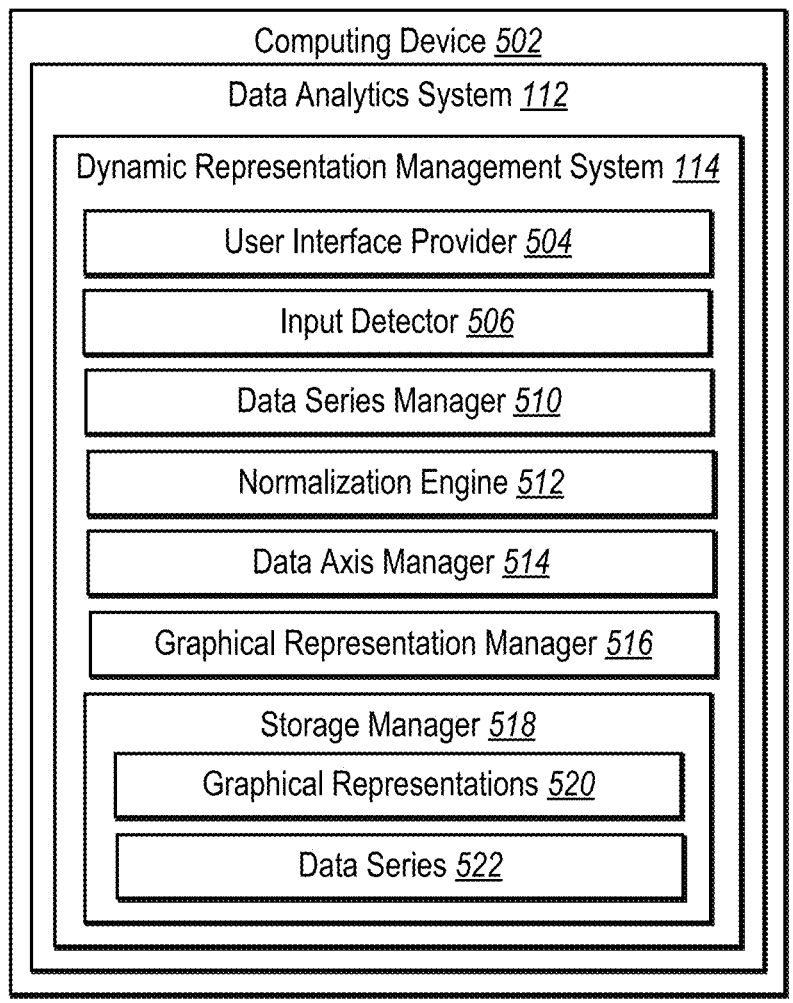
FIG. 5 illustrates a schematic diagram of a computing device upon which at least a portion of a dynamic representation management system may be implemented in accordance with one or more embodiments.

Referring now to FIG. 5, additional detail will be provided regarding capabilities and components of the dynamic representation management system 114 in accordance with one or more embodiments. In particular, FIG. 5 shows a schematic diagram of an example architecture of the dynamic representation management system 114 located within a data analytics system 112 and hosted on a computing device 502. The dynamic representation management system 114 can represent one or more embodiments of the dynamic representation management system 114 described previously.

As shown, the dynamic representation management system 114 is located on a computing device 502 within a data analytics system 112, as described above. In general, the computing device 502 may represent various types of computing devices (e.g. the server device(s) 110 or the client device 102). For example, in some embodiments, the computing device 502 is a non-mobile device, such as a desktop or server, or client device 102. In other embodiments, the computing device 502 is a mobile device, such as a mobile telephone, a smartphone, a PDA, a tablet, a laptop, etc. Additional details with regard to the computing device 502 are discussed below as well as with respect to FIG. 7.

As illustrated in FIG. 5, the dynamic representation management system 114 includes various components for performing the processes and features described herein. For example, the dynamic representation management system 114 includes a user interface provider 504, an input detector 506, a data series manager 510, a normalization engine 512, a data axis manager 514, a graphical representation manager 516, and a storage manager 518. Each of these components is described below in turn.

FIG. 5 illustrates schematic diagram of a computing device 502 upon which at least a portion of the dynamic representation management system 114 may be implemented in accordance with one or more embodiments. Each of the components 504-522 of the dynamic representation management system 114 can include software, hardware, or both. For example, the components 504-522 can include one or more instructions stored on a computer-readable storage medium and executable by processors of one or more computing devices, such as the client device 102 or server device(s) 110. When executed by the one or more processors, the computer-executable instructions of the dynamic representation management system 114 can cause the computing device(s) to perform the methods described herein. Alternatively, the components 504-522 can include hardware, such as a special-purpose processing device to perform a certain function or group of functions. Alternatively, the components 504-522 of the dynamic representation management system 114 can include a combination of computer-executable instructions and hardware.

Furthermore, the components 504-522 of the dynamic representation management system 114 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 504-522 may be implemented as a stand-alone application, such as a desktop or mobile application. Furthermore, the components 504-522 may be implemented as one or more web-based applications hosted on a remote server. The components 504-522 may also be implemented in a suite of mobile device applications or "apps." To illustrate, the components 504-522 may be implemented in an application, including but not limited to ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are either registered trademarks or trademarks of Adobe Systems Incorporated in the United States and/or other countries.

As shown in FIG. 5, the dynamic representation management system 114 may include the user interface provider 504. The user interface provider 504 can generate and/or provide graphical user interfaces for display to the client device 102. For example, the user interface provider 504 may provide the various graphical user interface elements discussed in detail with regard to FIGS. 2-4 to a client device 102. Specifically, the user interface provider 504 may provide, to the client device 102, the dynamic graphical representation 250, 411, various data axes, various data lines, the data series table 401, and/or the x-axis selection area 424. The user interface provider 504 may provide many graphical user interfaces across a variety of user contexts and environments.

Additionally, as shown in FIG. 5, the dynamic representation management system 114 also includes the input detector 506. The input detector 506 can identify, receive, and/or detect user input, as discussed in greater detail with regard to FIGS. 2-4. For example, the input detector 506 may detect user input via the client device 102 selecting data series for visualization in a dynamic graphical representation 250, 411. The input detector 506 may also detect user input selecting a data series to be put in-focus, or user input at the x-axis selection area 424 selecting a section of data to be displayed in the dynamic graphical representation 411. The input detector 506 may detect any user input relevant to the dynamic representation management system 114 across a variety of embodiments.

Also, as shown in FIG. 5, the dynamic representation management system 114 also includes the data series manager 510. The data series manager 510 can identify, access, manage, analyze, and provide data series. For example, the data series manager 510 can identify and provide various data series to the client device 102 based on user selection of a data series via a user interface. Additionally, the data series manager 510 may identify and suggest relevant data series to the user 106 based on user input, user information, and/or user settings.

Further, as shown in FIG. 5, the dynamic representation management system 114 may include the normalization engine 512. The normalization engine 512 can create, generate, and/or provide normalized data series (e.g., based on initial values in a data series). Similar to the discussion above with regard to normalization, the normalization engine 512 may normalize various data series using various methods and formulas, including determining a z-score. Additionally, the normalization engine 512 may normalize values to fall within a variety of ranges.

As shown in FIG. 5, the dynamic representation management system 114 may also include a graphical representation manager 516. The graphical representation manager 516 can generate, manage, revise, modify, and/or alter data axes in response to user input. For example, based on a user selection of a new in-focus data series, the graphical representation manager 516 can modify the data axes on the dynamic y-axis 418 to reflect the scale and y-variable of the initial values for the selected data series. Additionally, the data axis manager 510 may, in response to the dynamic representation management system's 114 detection of the inclusion of a third data series, include a normalized data axis in lieu of another data axis, as discussed in greater detail with regard to FIG. 4C.

Additionally, as shown in FIG. 5, the dynamic representation management system 114 also includes a graphical representation manager 516. The graphical representation manager 516 can generate, provide, modify, and/or manage graphical representations. For example, the graphical representation manager 516 may generate various data lines in response to user input, as discussed in greater detail with regard to FIGS. 4A-4E. Further, the graphical representation manager 516 may plot data series, including normalized values corresponding to data series, as data lines on dynamic graphical representations. The graphical representation manager 516 may also modify the data lines presented on a dynamic graphical representation 250, 411 in response to user input.

Also, as shown in FIG. 5, the dynamic representation management system 114 also includes the storage manager 518. The storage manager 518 can store and/or manage data on behalf of the dynamic representation management system 114. The storage manager 518 may store any data relevant to the dynamic representation management system 114. For example, the storage manager 518 may store graphical representations 520 and data series 522.

Figure 6:
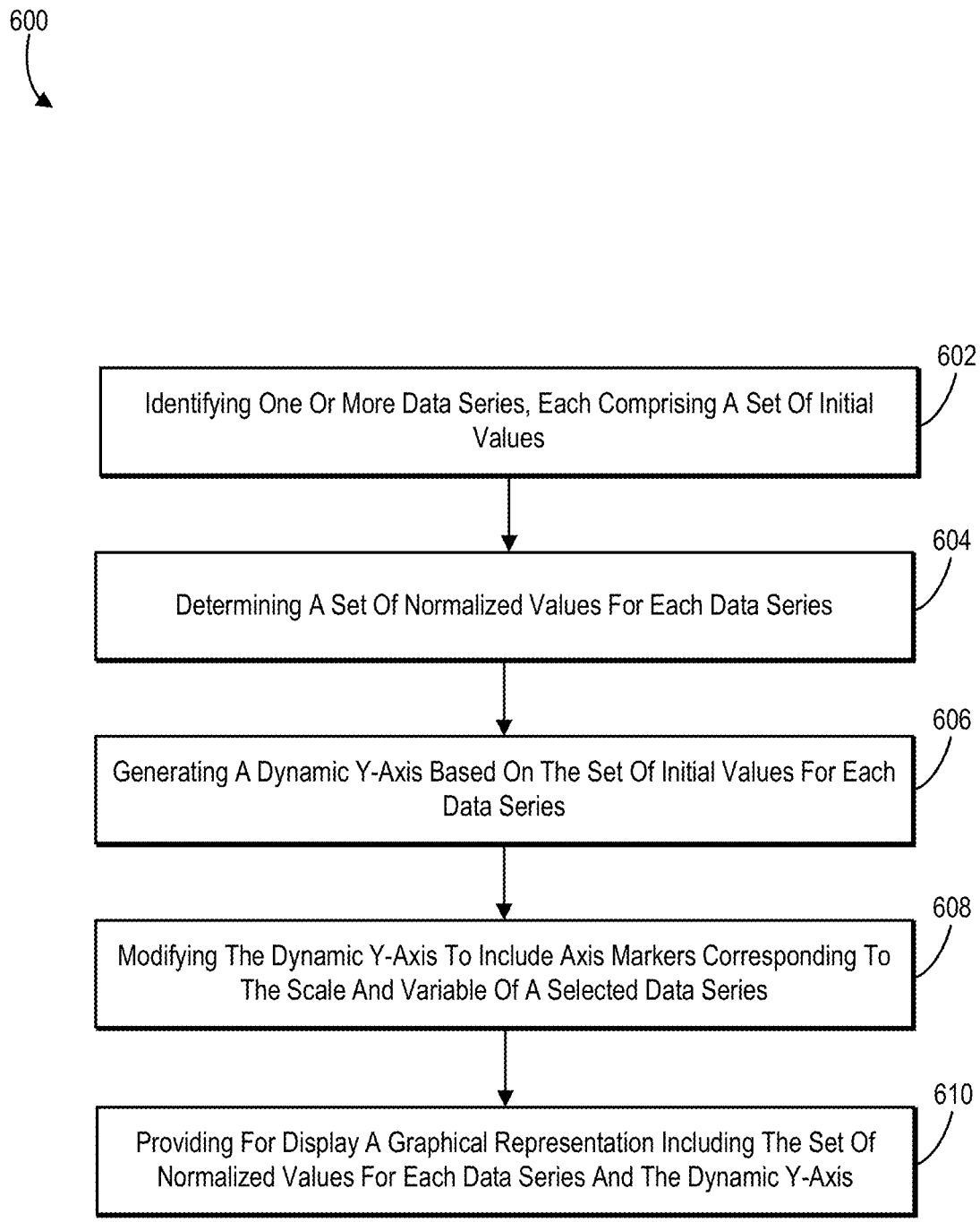
FIG. 6 illustrates a block diagram of an example computing device for implementing one or more embodiments of the present disclosure.

FIGS. 1-5, the corresponding text, and the examples provide a number of different methods, systems, devices, and non-transitory computer-readable media of the dynamic representation management system 114. In addition to the foregoing, one or more embodiments can also be described in terms of flowcharts comprising acts for accomplishing a particular result, as shown in FIG. 6. FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a series of acts 600 for generating and managing a dynamic graphical representation 411 in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device 502 to perform the acts of FIG. 6. In some embodiments, a system can perform the acts of FIG. 6.

As illustrated in FIG. 6, the series of acts 600 includes an act 602 of identifying one or more data series, each comprising a set of initial values. For example, the act 602 can involve identifying, via a client device 102, a first data series and a second data series, wherein the first data series comprises a first set of initial values and the second data series comprises a second set of initial values. The act 602 may also include identifying, via a client device 102, a plurality of data series comprising a plurality of initial values. Further, the act 602 can include identifying, via a client device 102, a first data series and a second data series, wherein the first data series comprises a first set of initial values for an x-variable and a second set of initial values for a first y-variable and wherein the second data series comprises a third set of initial values for the x variable and a fourth set of initial values for a second y-variable.

Further, as shown in FIG. 6, the method 600 includes an act 604 of determining a set of normalized values for each data series. For example, the act 604 can involve determining a first set of normalized values based on the first data series and a second set of normalized values based on the second data series. The act 604 may also include determining a first set of normalized values for the first data series and a second set of normalized values for the second data series based on the second set of initial values for the first y-variable and the fourth set of initial values for the second y-variable. In one or more embodiments, determining the first set of normalized values and the second set of normalized values comprises transforming the first data series and the second data series using a z-score.

Additionally, as shown in FIG. 6, the method 600 includes an at 606 of generating a dynamic y-axis 418 based on the set of initial values for each data series. For example, the act 606 can include generating a dynamic y-axis 418 based on the first set of initial values and the second set of initial values. The act 606 may also include, in response to detecting selection of the first data series via the client device 102, generating, based on the second set of initial values for a first y-variable, a first y-axis comprising unit-specific axis markers corresponding to the first y-variable.

Also, as shown in FIG. 6, the method 600 includes an act 608 of modifying the dynamic y-axis 418 to include axis markers corresponding to the scale and y-variable of a selected data series. For example, the act 608 can include, in response to detecting a selection of the first data series, modifying the dynamic y-axis 418 to include unit-specific axis markers corresponding to the first set of initial values of the first data series. Further, in response to detecting a second selection of the second data series, the dynamic representation management system 114 may alter the dynamic y-axis 418 to include altered unit-specific axis markers corresponding to the second set of initial values, and provide for display, via the client device 102, a modified graphical representation comprising the dynamic y-axis 418 comprising the altered axis markers corresponding to the second set of initial values. Additionally, in one or more embodiments, altering the dynamic y-axis 418 does not modify a plotting of the first data series and the second data series. Further, in one or more embodiments, the dynamic representation management system 114 may generate, based on the fourth set of initial values for the second y-variable, a second y-axis comprising unit-specific axis markers corresponding to the second y-variable, and provide for display, via the client device 102, a modified graphical representation comprising the second y-axis.

Further, in one or more embodiments, the dynamic representation management system 114 may identify, via the client device 102, a third data series, wherein the third data series comprises a third set of initial values, and in response to detecting a selection of the third data series, modifying the dynamic y-axis 418 to include modified unit-specific axis markers corresponding to the third set of initial values. In one or more embodiments, the dynamic representation management system 114 may identify, via the client device 102, a third data series, wherein the third data series comprises a fifth set of initial values for the x-variable and a sixth set of initial values for a third y-variable, generate, based on the sixth set of initial values for the third y-variable, a third y-axis comprising unit-specific axis markers corresponding to the third y-variable, and alter, in response to detecting selection of the third data series, the graphical representation to comprise the third y-axis in place of the first y-axis.

As illustrated in FIG. 6, the method 600 also includes providing for display a graphical representation including the set of normalized values for each data series and the dynamic y-axis 418. For example, the act 610 can include, in response to detecting a selection of the first data series, providing for display, via the client device 102, a graphical representation comprising the first set of normalized values, the second set of normalized values, and the dynamic y-axis 418 comprising the unit-specific axis markers corresponding to the first set of initial values. The act 610 may also include providing for display, via the client device 102, the generated normalized graphical representation comprising the dynamic y-axis 418.

Additionally, the act 610 can include, in response to detecting selection of the first data series via the client device 102, providing for display, via the client device 102, a graphical representation comprising the first y-axis comprising the unit-specific axis markers corresponding to the first y-variable, the normalized values for the first data series plotted against the first set of values for the x-variable, and the normalized values for the second data series plotted against the third set of values for the x-variable.

As discussed above, the graphical representation may further comprise a normalized y-axis 410 with normalized axis markers. In other words, the graphical representation may further comprise a normalized y-axis 410 comprising normalized axis markers based on the first set of normalized values and the second set of normalized values. Further, in one or more embodiments, the modified graphical representation further comprises a normalized y-axis 410 comprising normalized axis markers based on the first set of normalized values and the second set of normalized values.

Additionally, in response to a first selection of a first data series comprising a first set of initial values, the dynamic y-axis 418 may comprise a first set of unit-specific axis markers corresponding to the first set of initial values. Further, in response to a second selection of a second data series comprising a second set of initial values, the dynamic y-axis 418 may comprise a second set of unit-specific axis markers corresponding to the second set of initial values. Also, the plurality of data series may comprise at least three data series and the normalized graphical representation may comprise at least three normalized representations of the at least three data series. In addition, in one or more embodiments, the graphical representation further comprises a y-axis comprising the unit-specific axis markers corresponding to the second set of initial values. In one or more embodiments, the dynamic representation management system 114 may also detect user input related to the first data series, and change, within the graphical representation, one or more visual features of the first set of normalized values.

In addition (or in the alternative) to the acts describe above, in some embodiments, the series of acts 600 include a step for generating a normalized graphical representation of the plurality of data series, wherein the normalized graphical representation comprises a dynamic y-axis 418 with axis markers that change to reflect individual data series of the plurality of data series. The algorithms and acts described in relation to FIG. 3 (e.g., the acts 302-312) can comprise the corresponding acts for generating a normalized graphical representation of the plurality of data series, wherein the normalized graphical representation comprises a dynamic y-axis 418 with axis markers that change based on selection of individual data series of the plurality of data series.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
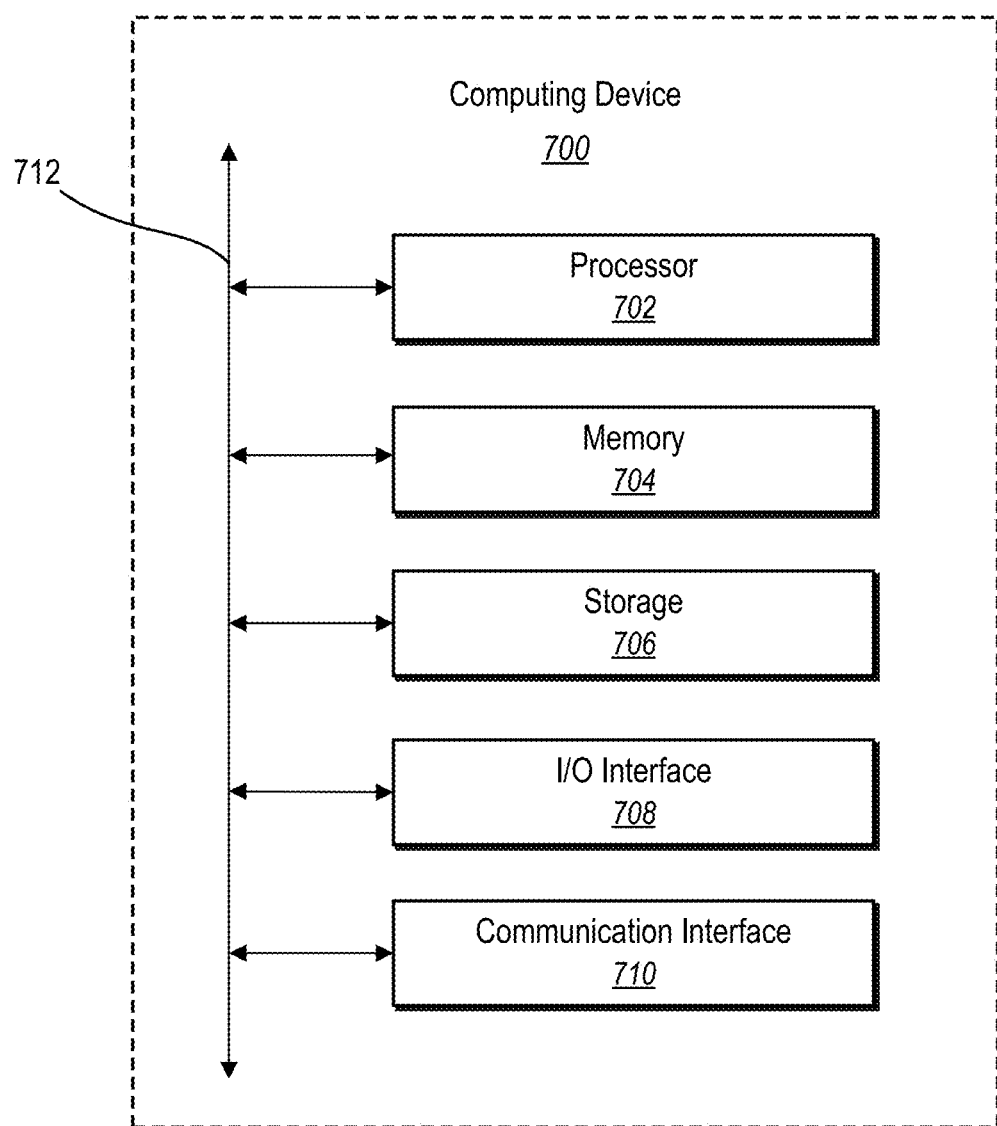
FIG. 7 illustrates a block diagram of an example computing device in accordance with one or more embodiments.

FIG. 7 illustrates a block diagram of an example computing device 700 that may be configured to perform one or more of the processes described above. One will appreciate that one or more computing devices, such as the computing device 700 may represent the computing devices described above (e.g., the computing device 403, the computing device 502, the server device(s) 110, and the client device 102). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client device 102). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of computing device 700 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A computer-implemented method for improving graphical user interfaces for simultaneously analyzing multiple data series by generating normalized graphical representations with dynamic digital axes, comprising:
   identifying a plurality of data series comprising a plurality of initial values;
   a step for generating a normalized graphical representation of the plurality of data series, wherein the normalized graphical representation comprises a dynamic y-axis with axis markers that change to reflect individual data series of the plurality of data series; and
   providing for display, via a client device, the generated normalized graphical representation comprising the dynamic y-axis.

2. The method of claim 1, wherein the graphical representation further comprises a normalized y-axis with normalized axis markers.

3. The method of claim 2, wherein, in response to a first selection of a first data series comprising a first set of initial values, the dynamic y-axis comprises a first set of unit-specific axis markers corresponding to the first set of initial values.

4. The method of claim 3, further comprising:
   modifying, in response to a second selection of a second data series comprising a second set of initial values, the dynamic y-axis to comprise a second set of unit-specific axis markers corresponding to the second set of initial values.

5. The method of claim 1, wherein the plurality of data series comprise at least three data series and the normalized graphical representation comprises at least three normalized representations of the at least three data series.

6. A non-transitory computer-readable medium storing instructions that, when executed by at least one processor, cause a computer system to:
   identify a first data series and a second data series, wherein the first data series comprises a first set of initial values and the second data series comprises a second set of initial values;
   determine a first set of normalized values based on the first data series and a second set of normalized values based on the second data series;
   generate a dynamic y-axis based on the first set of initial values and the second set of initial values;
   based on a determination that the first data series is in-focus, modify axis markers on the dynamic y-axis to add unit-specific axis markers corresponding to the first set of initial values of the first data series; and
   provide for display, via a client device, a graphical representation comprising the first set of normalized values, the second set of normalized values, and the dynamic y-axis comprising the unit-specific axis markers corresponding to the first set of initial values.

7. The computer-readable medium of claim 6, wherein the graphical representation further comprises a normalized y-axis comprising normalized axis markers based on the first set of normalized values and the second set of normalized values.

8. The computer-readable medium of claim 6, further comprising instructions that, when executed by the at least one processor, cause the computer system to, in response to detecting a second selection of the second data series:
   alter the dynamic y-axis to include altered unit-specific axis markers corresponding to the second set of initial values; and
   provide for display, via the client device, a modified graphical representation comprising the dynamic y-axis comprising the altered unit-specific axis markers corresponding to the second set of initial values.

9. The computer-readable medium of claim 8, wherein altering the dynamic y-axis does not modify a plotting of the first data series and the second data series.

10. The computer-readable medium of claim 6, wherein the graphical representation further comprises a y-axis comprising the unit-specific axis markers corresponding to the second set of initial values.

11. The computer-readable medium of claim 6, further comprising instructions that, when executed by the at least one processor, cause the computer system to:
   identify, via the client device, a third data series, wherein the third data series comprises a third set of initial values; and
   in response to detecting a selection of the third data series, modifying the dynamic y-axis to include modified unit-specific axis markers corresponding to the third set of initial values.

12. The computer-readable medium of claim 6, wherein determining the first set of normalized values and the second set of normalized values comprises transforming the first data series and the second data series using a z-score.

13. The computer-readable medium of claim 6, further comprising instructions that, when executed by the at least one processor, cause the computer system to:
   detect user input related to the first data series; and
   change, within the graphical representation, one or more visual features of the first set of normalized values.

14. A system comprising:
   at least one processor; and
   at least one non-transitory computer-readable storage medium storing instructions that, when executed by the at least one processor, cause the system to:
      identify a first data series and a second data series, wherein the first data series comprises a first set of initial values for an x variable and a second set of initial values for a first y-variable and wherein the second data series comprises a third set of initial values for the x variable and a fourth set of initial values for a second y-variable;
      determine a first set of normalized values for the first data series and a second set of normalized values for the second data series based on the second set of initial values for the first y-variable and the fourth set of initial values for the second y-variable;
      in response to detecting selection of the first data series via a client device:
         generate, based on the second set of initial values for the first y-variable, a first y-axis comprising unit-specific axis markers corresponding to the first y-variable; and
         provide for display, via the client device, a graphical representation comprising the first y-axis comprising the unit-specific axis markers corresponding to the first y-variable, the normalized values for the first data series plotted against the first set of initial values for the x variable, the normalized values for the second data series plotted against the third set of initial values for the x variable, and a normalized y-axis comprising normalized axis markers based on the first set of normalized values and the second set of normalized values.

15. The system of claim 14, further comprising instructions that, when executed by the at least one processor, cause the system to:
   generate, based on the fourth set of initial values for the second y-variable, a second y-axis comprising unit-specific axis markers corresponding to the second y-variable; and
   in response to detecting a second selection of the second data series via the client device, modifying the graphical representation to include the second y-axis instead of the normalized y-axis.

16. The system of claim 14, further comprising instructions that, when executed by the at least one processor, cause the system to:
   generate, based on the fourth set of initial values for the second y-variable, a second y-axis comprising unit-specific axis markers corresponding to the second y-variable; and
   provide for display, via the client device, a modified graphical representation comprising the second y-axis.

17. The system of claim 16, wherein the modified graphical representation further comprises a normalized y-axis comprising normalized axis markers based on the first set of normalized values and the second set of normalized values.

18. The system of claim 14, further comprising instructions that, when executed by the at least one processor, cause the system to:

identify a third data series, wherein the third data series comprises a fifth set of initial values for the x variable and a sixth set of initial values for a third y-variable;

generate, based on the sixth set of initial values for the third y-variable, a third y-axis comprising unit-specific axis markers corresponding to the third y-variable; and alter, in response to detecting selection of the third data series, the graphical representation to comprise the third y-axis in place of the first y-axis.

19. The system of claim 14, wherein determining the first set of normalized values and the second set of normalized values comprises transforming the first data series and the second data series using a z-score.

20. The system of claim 14, further comprising instructions that, when executed by the at least one processor, cause the system to:

detect user input related to the first data series; and change, within the graphical representation, one or more visual features of the first set of normalized values.

\* \* \* \* \*